(12) United States Patent
Watanabe et al.

(10) Patent No.: US 9,653,747 B2
(45) Date of Patent: May 16, 2017

(54) FUEL CELL WITH SEAL CUT-OUTS ON THE SEPARATOR IN THE GAS PASSAGE

(75) Inventors: Yasuhiro Watanabe, Tokyo (JP); Masaaki Sakano, Utsunomiya (JP); Satoru Terada, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 111 days.

(21) Appl. No.: 13/451,627

(22) Filed: Apr. 20, 2012

(65) Prior Publication Data

US 2012/0270137 A1 Oct. 25, 2012

(30) Foreign Application Priority Data

Apr. 22, 2011 (JP) ................................. 2011-096041
Feb. 29, 2012 (JP) ................................. 2012-042602

(51) Int. Cl.
*H01M 8/241* (2016.01)
*H01M 8/0273* (2016.01)
(Continued)

(52) U.S. Cl.
CPC ......... *H01M 8/241* (2013.01); *H01M 8/0271* (2013.01); *H01M 8/0273* (2013.01);
(Continued)

(58) Field of Classification Search
CPC .................. H01M 8/006; H01M 8/10; H01M 8/0271–8/0286; H01M 8/0297; H01M 8/241; H01M 2008/1095
(Continued)

(56) References Cited

U.S. PATENT DOCUMENTS 6,503,653 B2 * 1/2003 Rock ............................. 429/434
6,667,124 B2 * 12/2003 Suenaga et al. .............. 429/480
(Continued)

FOREIGN PATENT DOCUMENTS

JP   2007-134204   5/2007
JP   2007-214092   8/2007
(Continued)

OTHER PUBLICATIONS

Jon P. Owejan, Jeffrey J. Gagliardo, Jacqueline M. Sergi, Satish G. Kandlikar, Thomas A. Trabold, Water management studies in PEM fuel cells, Part I: Fuel cell design and in situ water distributions, Feb. 23, 2009, International Journal of Hydrogen Energy, vol. 34, Issue 8, pp. 3436-3444.*

(Continued)

*Primary Examiner* — Milton I Cano
*Assistant Examiner* — Philip A Stuckey
(74) *Attorney, Agent, or Firm* — Nelson Mullins Riley & Scarborough LLP; Anthony A. Laurentano

(57) ABSTRACT

A fuel cell is formed by stacking a plurality of unit cells. Each of the unit cells includes a membrane electrode assembly, and an anode side metal separator and a cathode side metal separator sandwiching the membrane electrode assembly therebetween. In a surface of the cathode side metal separator, metal portions are exposed in at least part of a second flat portion in an area surrounded by seal lines SL of the anode side metal separator. Cutouts are formed on a surface of the cathode side metal separator by cutting at least part of the second flat portion up to the metal portions thereby to expose the metal portions through the cutouts.

6 Claims, 13 Drawing Sheets

(51) Int. Cl.
*H01M 8/0271* (2016.01)
*H01M 8/0276* (2016.01)
H01M 8/0297 (2016.01)
H01M 8/1018 (2016.01)

(52) U.S. Cl.
CPC ........ *H01M 8/0276* (2013.01); *H01M 8/0297* (2013.01); *H01M 2008/1095* (2013.01)

(58) Field of Classification Search
USPC ....... 429/482, 471, 469, 468, 467, 400, 463, 429/437
See application file for complete search history.

(56) References Cited

U.S. PATENT DOCUMENTS

| | | | |
|---|---|---|---|
| 7,776,490 B2* | 8/2010 | Sugiura et al. | 429/514 |
| 7,851,100 B2* | 12/2010 | Kobayashi et al. | 429/463 |
| 7,919,212 B2* | 4/2011 | Yagi et al. | 429/468 |
| 2002/0045084 A1* | 4/2002 | Fujii et al. | 429/30 |
| 2004/0137307 A1* | 7/2004 | Okonogi et al. | 429/37 |
| 2005/0079400 A1* | 4/2005 | Sugiura | H01M 8/0206 |
| | | | 429/483 |
| 2006/0040159 A1* | 2/2006 | Sato et al. | 429/34 |
| 2006/0073226 A1* | 4/2006 | Kimura et al. | 425/129.1 |
| 2007/0003816 A1* | 1/2007 | Sugita et al. | 429/39 |
| 2007/0020504 A1* | 1/2007 | Sugita et al. | 429/38 |
| 2007/0111079 A1* | 5/2007 | Terada | H01M 8/0228 |
| | | | 429/434 |
| 2009/0023035 A1* | 1/2009 | Sasaoka | 429/30 |
| 2009/0148748 A1* | 6/2009 | Okonogi et al. | 429/35 |
| 2010/0264558 A1* | 10/2010 | Kimura et al. | 264/40.3 |
| 2010/0297533 A1* | 11/2010 | Takeshita et al. | 429/508 |
| 2011/0274999 A1 | 11/2011 | Mohri et al. | |

FOREIGN PATENT DOCUMENTS

| | | |
|---|---|---|
| JP | 2010-153175 A | 7/2010 |
| WO | 2010/082589 A1 | 7/2010 |

OTHER PUBLICATIONS

Chinese Office Action for Application No. 201210112442.6, 9 pages, dated Jan. 17, 2014.
Japanese Office Action, Japanese Application No. 2012-042602, dated Jun. 16, 2015, 5 pages.

* cited by examiner

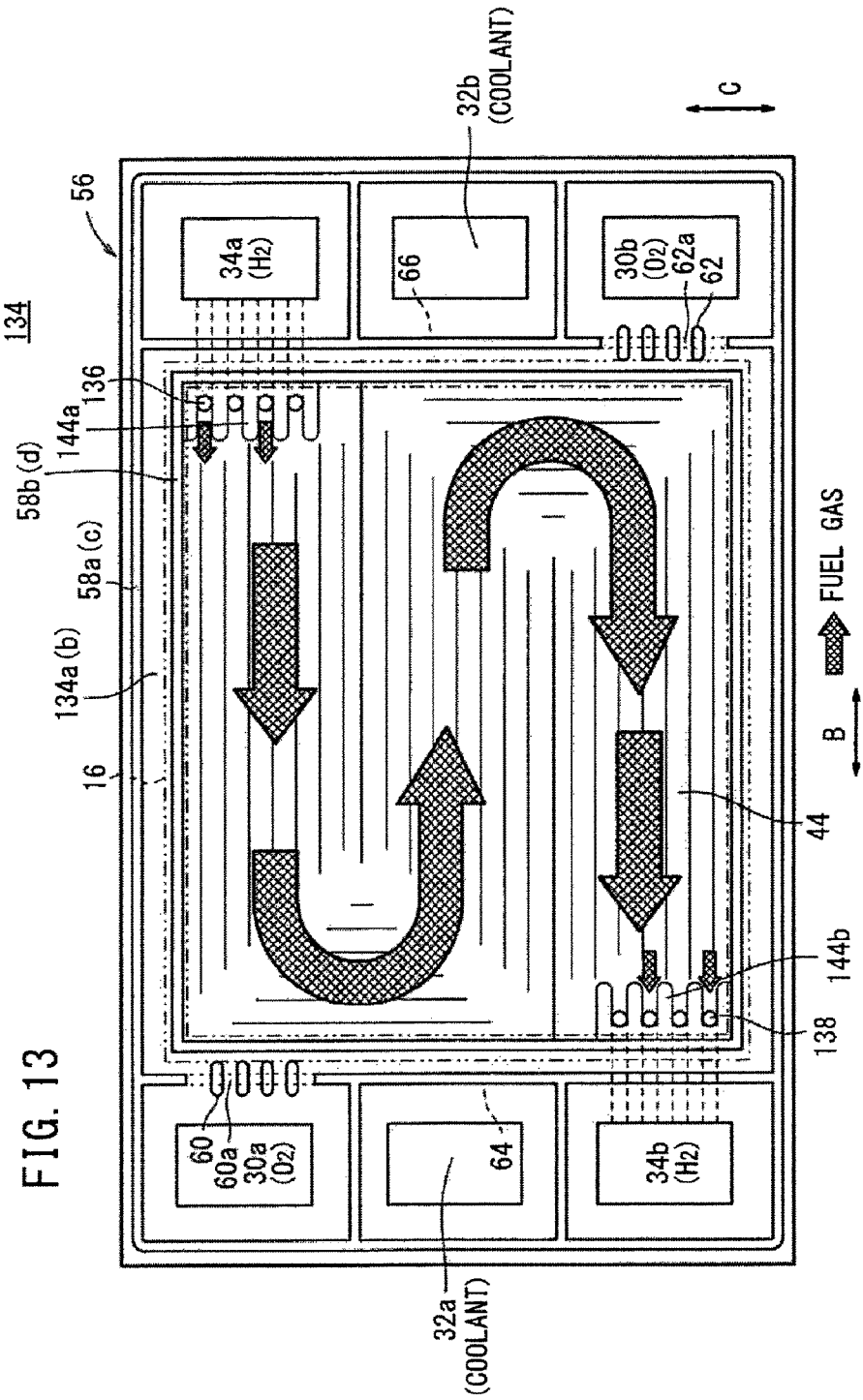

FUEL CELL WITH SEAL CUT-OUTS ON THE SEPARATOR IN THE GAS PASSAGE

CROSS-REFERENCE TO RELATED APPLICATION

This application is based upon and claims the benefit of priority from Japanese Patent Applications No. 2011-096041 filed on Apr. 22, 2011 and No. 2012-042602 filed on Feb. 29, 2012, of which the contents are incorporated herein by reference.

BACKGROUND OF THE INVENTION

Field of the Invention

The present invention relates to a fuel cell formed by stacking an electrolyte electrode assembly and separators in a stacking direction. The electrolyte electrode assembly includes a pair of electrodes and an electrolyte interposed between the electrodes. Elastic seal members are formed integrally with the separators. A reactant gas flow field for supplying a reactant gas along an electrode surface is formed between the electrolyte electrode assembly and the separator. A reactant gas passage extends through the fuel cell in the stacking direction. The reactant gas passage is connected to the reactant gas flow field.

Description of the Related Art

For example, a solid polymer electrolyte fuel cell includes a unit cell which comprises a membrane electrode assembly (MEA) and a pair of separators sandwiching the membrane electrode assembly therebetween. The membrane electrode assembly includes an anode, a cathode, and an electrolyte membrane (electrolyte) interposed between the anode and the cathode. The electrolyte membrane is a polymer ion exchange membrane.

In use of the fuel cell of this type in a vehicle, normally, a predetermined number of (e.g., several tens to hundreds of) unit cells are stacked together to form a fuel cell stack, in order to generate a desired power generation output. In general, the fuel cell stack adopts so called internal manifold structure where reactant gas flow fields for allowing reactant gases to flow in the separators along electrode surfaces, and reactant gas passages communicating with the reactant gas flow fields and which extend through the unit cells in the stacking direction are provided.

In the fuel cell, as separators, carbon separators or metal separators are used. As the metal separator, a metal separator integral with a seal member, including a thin metal plate and an elastic seal member formed integrally with the thin metal plate is used.

In the metal separator of this type, in the case where a highly humid reactant gas, a coolant water, or the like flows continuously, water permeated into a rubber serving as a seal member may be retained between the seal member and the metal plate undesirably. As a result, blisters are formed between the seal member and the metal plate, the cross sectional area of the flow field is reduced, and the flow rate of the reactant gas or the coolant water is accordingly decreased.

In this regard, for example, a fuel cell separator disclosed in Japanese Laid-Open Patent Publication No. 2007-134204 is known. The fuel cell separator has a structure where a space facing a surface of an anode side metal separator is provided as a coolant passage, and an insulating film is formed on the surface through a primer layer. In this structure, coolant discharge grooves are formed to prevent formation of blisters due to condensation of coolant vaporized at the interface between a base material and the primer layer.

In the structure, the temperature of a portion of the anode side metal separator that partially contacts the primer layer is lowered. Even if the coolant component vaporized at the interface therebetween is condensed to liquid, since the condensed component is discharged to the outside through the coolant discharge grooves, formation of the blisters can be prevented.

SUMMARY OF THE INVENTION

The blisters of this type are not only formed in the coolant water channel, but also formed, e.g., in reactant gas flow fields which contact reactant gases. In particular, in areas of the reactant gas flow fields surrounded by seal lines of seal members, it is desired to prevent formation of the blisters due to condensed water.

The present invention has been made to address the demand of this type, and an object of the present invention is to provide a fuel cell which is capable of, with a simple structure, discharging condensed water from the inside of a metal separator integral with a seal member easily and reliably, and also preventing formation of blisters as mush as possible.

The present invention relates to a fuel cell formed by stacking an electrolyte electrode assembly and separators in a stacking direction. The electrolyte electrode assembly includes a pair of electrodes and an electrolyte interposed between the electrodes. Elastic seal members are formed integrally with the separators. A reactant gas flow field for supplying a reactant gas along an electrode surface is formed between the electrolyte electrode assembly and the separator. A reactant gas passage extends through the fuel cell in the stacking direction. The reactant gas passage is connected to the reactant gas flow field.

A channel portion connecting the reactant gas passage to the reactant gas flow field is formed by the elastic seal members, between the pair of separators. In the channel portion, a separator body portion is exposed in at least part of the elastic seal members provided in the separators.

In the present invention, when condensed water is produced between the elastic seal member and the separator body portion as a result of continued power generation, the condensed water is discharged through the separator body portion exposed in at least part of the elastic seal member. Thus, with a simple structure, the condensed water can be discharged easily and reliably from the inside of the separator integral with a seal member, and formation of blisters can be prevented as much as possible.

Further, since grooves for discharging condensed water are not required, the structure can be simplified advantageously.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 13 is a front elevational view showing one surface of an anode side metal separator of the fuel cell.

DESCRIPTION OF THE PREFERRED EMBODIMENTS

Figure 1:
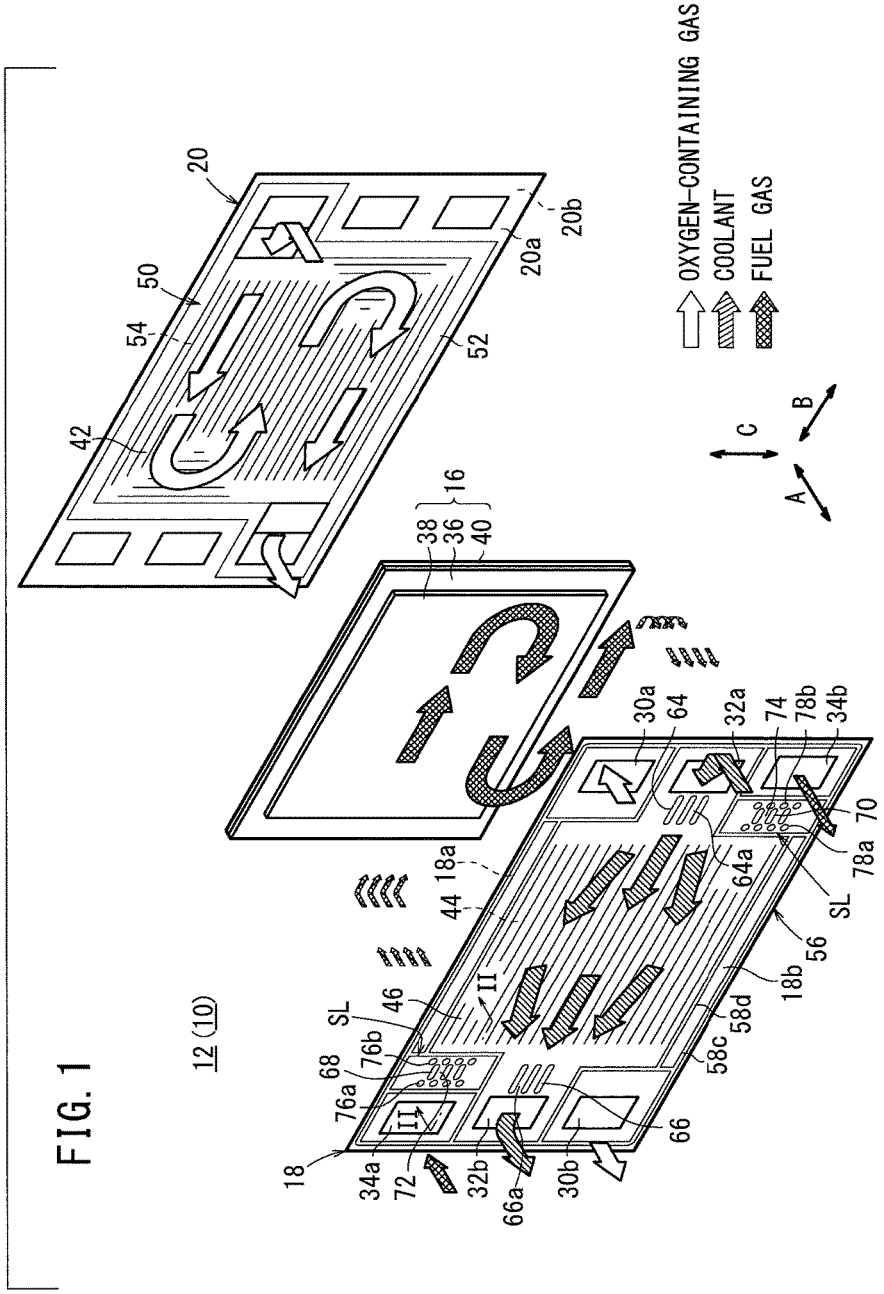
FIG. 1 is an exploded perspective view showing main components of a fuel cell according to a first embodiment of the present invention.
Figure 2:
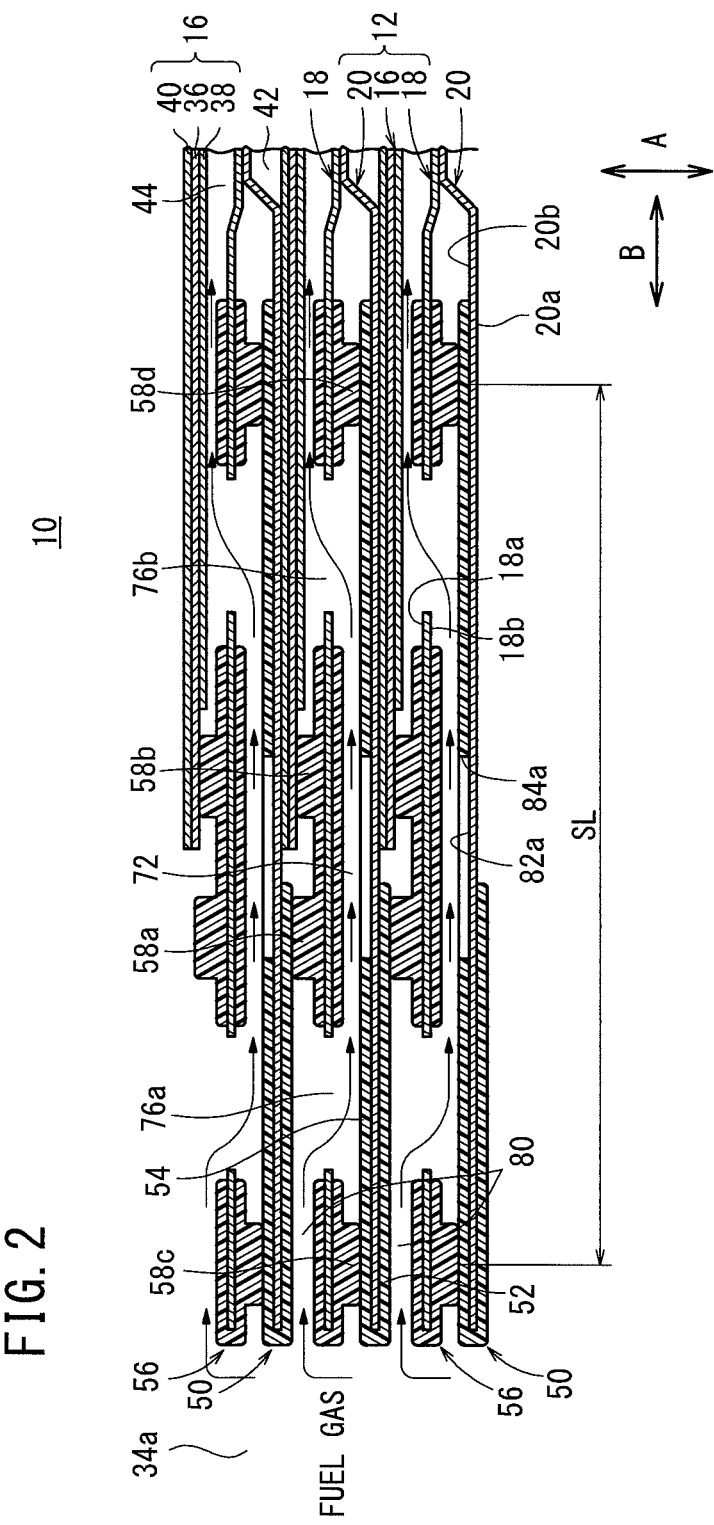
FIG. 2 is a cross sectional view showing the fuel cell, taken along a line II-II in FIG. 1.

As shown in FIGS. 1 and 2, a fuel cell 10 according to a first embodiment of the present invention is formed by stacking a plurality of unit cells 12 in a direction indicated by an arrow A. Each of the unit cells 12 includes a membrane electrode assembly (electrolyte electrode assembly) 16, and an anode side metal separator (one separator) 18 and a cathode side metal separator (other separator) 20 sandwiching the membrane electrode assembly 16 therebetween.

For example, the anode side metal separator 18 and the cathode side metal separator 20 are made of steel plates, stainless steel plates, aluminum plates, plated steel sheets, or metal plates having anti-corrosive surfaces by surface treatment. As described later, the anode side metal separator 18 and the cathode side metal separator 20 are metal separators integral with seal members. Incidentally, the anode side metal separator 18 and the cathode side metal separator 20 may be made of material other than metal, for example, carbon.

At one end of the unit cell 12 in a horizontal direction indicated by an arrow B in FIG. 1, an oxygen-containing gas discharge passage (reactant gas passage) 30b for discharging an oxygen-containing gas (reactant gas), a coolant discharge passage 32b for discharging a coolant, and a fuel gas supply passage (reactant gas passage) 34a for supplying a hydrogen-containing gas are arranged in a vertical direction indicated by an arrow C. The oxygen-containing gas discharge passage 30b, the coolant discharge passage 32b, and the fuel gas supply passage 34a extend through the unit cell 12 in the stacking direction indicated by the arrow A.

At the other end of the unit cell 12 in the direction indicated by the arrow B, a fuel gas discharge passage (reactant gas passage) 34b for discharging the fuel gas, a coolant supply passage 32a for supplying the coolant, and an oxygen-containing gas supply passage (reactant gas passage) 30a for supplying the oxygen-containing gas are arranged in the direction indicated by the arrow C. The fuel gas discharge passage 34b, the coolant supply passage 32a, and the oxygen-containing gas supply passage 30a extend through the unit cell 12 in the direction indicated by the arrow A.

For example, the membrane electrode assembly 16 includes an anode 38, a cathode 40, and a solid polymer electrolyte membrane (electrolyte) 36 interposed between the anode 38 and the cathode 40. The solid polymer electrolyte membrane 36 is formed by impregnating a thin membrane of perfluorosulfonic acid with water, for example. The surface area of the anode 38 is smaller than the surface areas of the cathode 40 and the solid polymer electrolyte membrane 36, and such an MEA is called "a stepped type MEA". However, the present invention is not limited in this respect. For example, the surface area of the anode 38 may be the same as the surface area of the cathode 40.

Each of the anode 38 and the cathode 40 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

Figure 3:
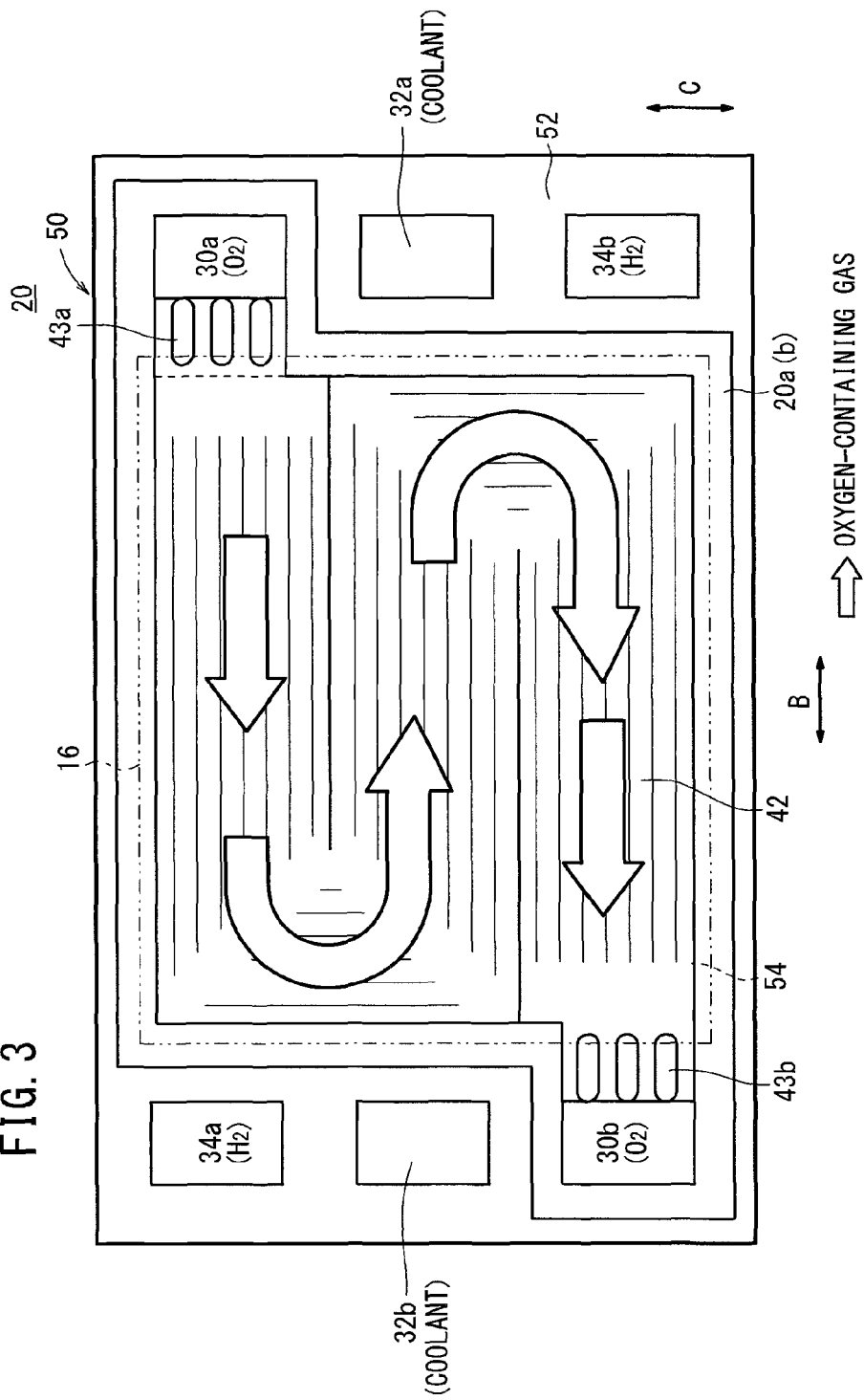
FIG. 3 is a front elevational view showing one surface of a cathode side metal separator of the fuel cell.

As shown in FIGS. 1 and 3, the cathode side metal separator 20 has an oxygen-containing gas flow field (reactant gas flow field) 42 on its surface 20a facing the membrane electrode assembly 16. The oxygen-containing gas flow field 42 includes grooves extending in a serpentine pattern for allowing the oxygen-containing gas to flow back and forth in the direction indicated by the arrow B, and flows vertically downwardly. The oxygen-containing gas flow field 42 is connected to the oxygen-containing gas supply passage 30a and the oxygen-containing gas discharge passage 30b. Bridge portions 43a, 43b are provided adjacent to the oxygen-containing gas supply passage 30a and the oxygen-containing gas discharge passage 30b to cover the inlet and the outlet of the oxygen-containing gas flow field 42 (see FIG. 3).

Figure 4:
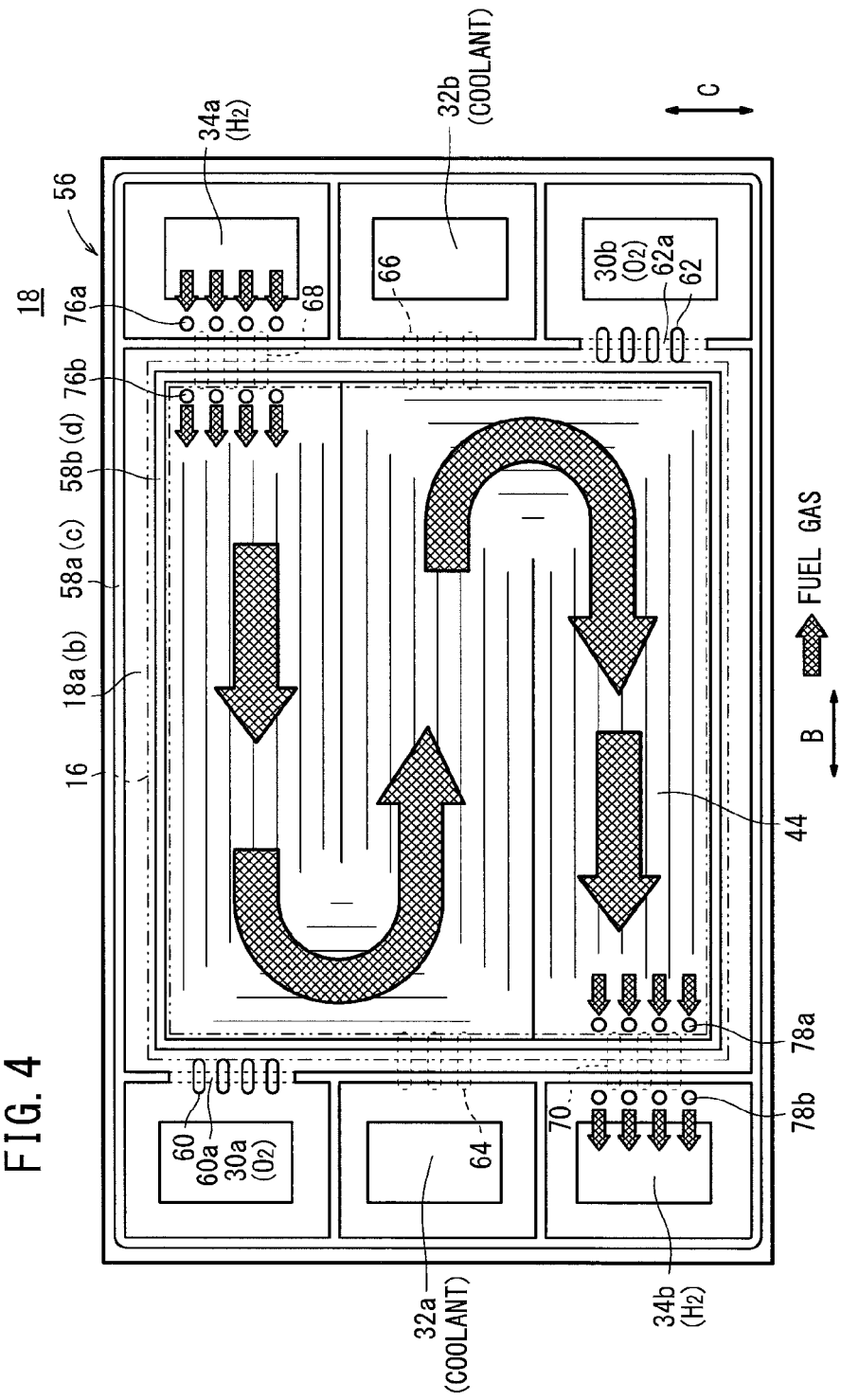
FIG. 4 is a front elevational view showing an anode side metal separator of the fuel cell.

As shown in FIG. 4, the anode side metal separator 18 has a fuel gas flow field (reactant gas flow field) 44 on its surface 18a facing the membrane electrode assembly 16. The fuel gas flow field 44 includes grooves extending in a serpentine pattern for allowing the fuel gas to flow back and forth in the direction indicated by the arrow B, and flows vertically downwardly (in the direction indicated by the arrow C). The fuel gas flow field 44 is connected to the fuel gas supply passage 34a and the fuel gas discharge passage 34b.

Figure 5:
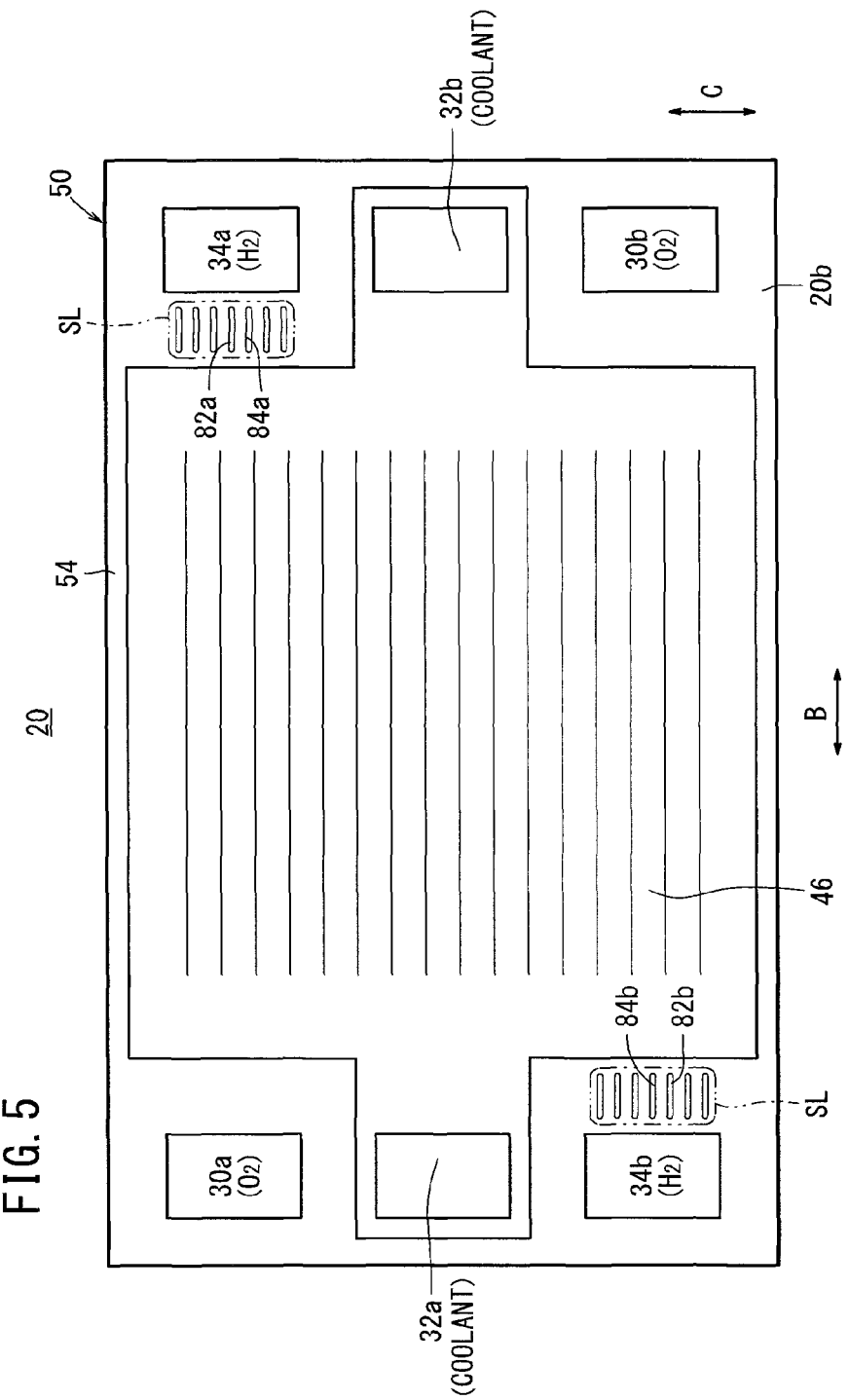
FIG. 5 is a front elevational view showing the other surface of the cathode side metal separator of the fuel cell.

As shown in FIGS. 1 and 5, a coolant flow field 46 is formed between a surface 18b of the anode side metal separator 18 and a surface 20b of the cathode side metal separator 20. The coolant flow field 46 is connected to the coolant supply passage 32a and the coolant discharge passage 32b. The coolant flow field 46 includes grooves extending straight along the separator surfaces in the direction indicated by the arrow B. One coolant flow field 46 may be provided for each of the unit cells 12. Alternatively, one coolant flow field 46 may be provided for every two or more unit cells 12.

As shown in FIGS. 1 and 3, a first seal member 50 is formed integrally with the surfaces 20a, 20b of the cathode side metal separator 20, around the outer circumferential end of the cathode side metal separator 20. The first seal member 50 is an elastic seal member, e.g., made of silicone rubber.

As shown in FIGS. 2 and 3, the first seal member 50 includes a first flat portion 52 formed integrally with the surface 20a of the cathode side metal separator 20, and a second flat portion 54 formed integrally with the surface 20b of the cathode side metal separator 20. The second flat portion 54 is longer than the first flat portion 52.

As shown in FIG. 2, the first flat portion 52 is formed circumferentially around the membrane electrode assembly 16 at a position spaced outwardly from the outer circumferential end of the membrane electrode assembly 16. The second flat portion 54 is formed circumferentially such that the second flat portion 54 is overlapped with the outer circumference of the cathode 40 in the stacking direction over a predetermined area.

As shown in FIG. 3, the first flat portion 52 is formed so as to connect the oxygen-containing gas supply passage 30a and the oxygen-containing gas discharge passage 30b to the oxygen-containing gas flow field 42. As shown in FIG. 5, the second flat portion 54 is formed so as to connect the coolant supply passage 32a and the coolant discharge passage 32b to the coolant flow field 46.

As shown in FIGS. 1, 2, and 4, the second seal member 56 is formed integrally with the surfaces 18a, 18b of the anode side metal separator 18, around the outer circumferential end of the anode side metal separator 18. The second seal member 56 includes a convex outer seal 58a provided on the surface 18a, adjacent to the outer end of the anode side metal separator 18, and a convex inner seal 58b provided at a position spaced inwardly from the outer seal 58a by a predetermined distance.

As shown in FIG. 2, the outer seal 58a contacts the first flat portion 52 provided on the cathode side metal separator 20, and the inner seal 58b directly contacts the solid polymer electrolyte membrane 36 of the membrane electrode assembly 16.

As shown in FIG. 4, the outer seal 58a is provided so as to surround the oxygen-containing gas supply passage 30a, the coolant supply passage 32a, the fuel gas discharge passage 34b, the fuel gas supply passage 34a, the coolant discharge passage 32b, and the oxygen-containing gas discharge passage 30b. The inner seal 58b is provided so as to surround the fuel gas flow field 44. The outer circumferential end of the membrane electrode assembly 16 is arranged between the inner seal 58b and the outer seal 58a.

A convex outer seal 58c corresponding to the outer seal 58a and a convex inner seal 58d corresponding to the inner seal 58b are provided on the surface 18b of the anode side metal separator 18 (see FIG. 1). The outer seal 58c and the inner seal 58d have the same shapes as those of the outer seal 58c and the inner seal 58b.

As shown in FIG. 4, the outer seal 58a includes a plurality of receivers 60 connecting the oxygen-containing gas supply passage 30a to the oxygen-containing gas flow field 42, and a plurality of receivers 62 connecting the oxygen-containing gas discharge passage 30b to the oxygen-containing gas flow field 42. The receivers 60 form a connection channel 60a, and the receiver 62 form a connection channel 62a.

As shown in FIGS. 1 and 4, a plurality of receivers 64 connecting the coolant supply passage 32a to the coolant flow field 46, and a plurality of receivers 66 connecting the coolant discharge passage 32b to the coolant flow field 46 are provided on the surface 18b of the anode side metal separator 18. The receivers 64, 66 form connection channels 64a, 66a, respectively.

On the surface 18b of the anode side metal separator 18, a plurality of receivers 68, 70 are provided adjacent to the fuel gas supply passage 34a and the fuel gas discharge passage 34b, respectively. The receivers 68 form an inlet side connection channel 72 and the receivers 70 form an outlet side connection channel 74.

On the surface 18a of the anode side metal separator 18, the fuel gas supply passage 34a and the fuel gas discharge passage 34b are surrounded by the outer seal 58a (see FIG. 4), and on the surface 18b of the anode side metal separator 18, the receivers 68 and the receivers 70 are surrounded by seal lines SL formed by the outer seal 58c and the inner seal 58d (see FIG. 1).

A plurality of first supply holes (first holes) 76a extend through the anode side metal separator 18 between the receivers 68 and the fuel gas supply passage 34a, more specifically through a portion where an area surrounded by the outer seal 58a and an area surrounded by the outer seal 58c and the inner seal 58d are overlapped with each other.

A plurality of second supply holes (second holes) 76b extend through the anode side metal separator 18 between the receivers 68 and the fuel gas flow field 44, more specifically through a portion where an area surrounded by the inner seal 58b and an area surrounded by the outer seal 58c and the inner seal 58d are overlapped with each other.

Thus, a channel portion connecting the fuel gas supply passage 34a to the fuel gas flow field 44 is formed. The channel portion includes first supply holes 76a, the inlet side connection channel 72, and second supply holes 76b, and the channel portion is surrounded by the seal lines SL (see FIGS. 1 and 2). It should be noted that three or more supply holes (not shown) may be provided in the channel portion.

A plurality of first discharge holes (second holes) 78a are formed adjacent to the receivers 70 and adjacent to the exit of the fuel gas flow field 44. A plurality of second discharge holes (first holes) 78b extend through the anode side metal separator 18, at positions adjacent to the fuel gas discharge passage 34b.

The first discharge holes 78a are provided in a portion where an area surrounded by the inner seal 58b on the surface 18a and an area surrounded by the outer seal 58c and the inner seal 58d on the surface 18b are overlapped with each other. The second discharge holes 78b are provided in a portion where an area on the surface 18a defined by a portion of the outer seal 58a that surrounds the fuel gas discharge passage 34b and an area surrounded by the outer seal 58c and the inner seal 58d on the surface 18b are overlapped with each other.

Thus, a channel portion connecting the fuel gas discharge passage 34b to the fuel gas flow field 44 is formed. The channel portion includes first discharge holes 78a, the outlet side connection channel 74, and the second discharge holes 78b. The channel portion is surrounded by the seal lines SL.

As shown in FIG. 2, a channel 80 from the fuel gas supply passage 34a to the first supply holes 76a is formed by the first and second seal members 50, 56. Likewise, the inlet side connection channel 72 is formed by the first and second seal members 50, 56. A space between the first and second supply holes 76a, 76b on the opposite side of the inlet connection channel 72 is sealed by the first and second seal members 50, 56.

As shown in FIG. 5, on the surface 20b of the cathode side metal separator 20, metal portions (separator body portions) 82a, 82b are exposed in part of the second flat portion 54 in a range (including the channel portion) surrounded by the seal lines SL of the anode side metal separator 18. More specifically, as shown in FIG. 2, cutouts 84a, 84b for exposing the metal portions 82a, 82b therethrough are formed on the surface 20b of the cathode side metal separator 20, by cutting out at least part of the second flat portion 54 up to the metal portions 82a, 82b.

The cutouts 84a are formed into straight-line shapes adjacent to the fuel gas supply passage 34a so as to face the inlet side connection channel 72. The cutouts 84b extend straight adjacent to the fuel gas discharge passage 34b so as to face the outlet connection channel 74. The cutouts 84a, 84b are formed substantially along the channel portions. In the channel portions, the separator surface excluding the metal portions 82a, 82b are covered by the first seal member 50. Incidentally, the cutouts 84a, 84b may have a curved line shape, a bent shape, or the like, in addition to the above-mentioned straight-line shape.

Operation of this fuel cell 10 will be described below.

Firstly, as shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, oil, or the like is supplied to the coolant supply passage 32a.

Thus, the oxygen-containing gas flows from the oxygen-containing gas supply passage 30a through the connection channel 60a into the oxygen-containing gas flow field 42 of the cathode side metal separator 20. The oxygen-containing gas flows in a meandering manner, i.e., back and forth in the direction indicated by the arrow B along the oxygen-containing gas flow field 42, and moves vertically downwardly. The oxygen-containing gas is supplied to the cathode 40 of the membrane electrode assembly 16 (see FIGS. 1 and 3).

As shown in FIG. 2, after the fuel gas is supplied from the fuel gas supply passage 34a to the surface 18a facing the anode 38, the fuel gas flows through the first supply holes 76a, and the fuel gas is temporarily supplied to the surface 18b. On the surface 18b, the inlet side connection channel 72 is formed by a plurality of receivers 68. Thus, the fuel gas flows through the inlet side connection channel 72, and moves from the second supply holes 76b toward the surface 18a. Then, the fuel gas flows into the fuel gas flow field 44. Further, as shown in FIG. 4, the fuel gas flows in a meandering manner, i.e., back and forth in the direction indicated by the arrow B along the fuel gas flow field 44, and moves vertically downwardly. The fuel gas is supplied to the anode 38 of the membrane electrode assembly 16.

Thus, in each of the membrane electrode assemblies 16, the oxygen-containing gas supplied to the cathode 40, and the fuel gas supplied to the anode 38 are consumed in the electrochemical reactions at catalyst layers of the cathode 40 and the anode 38 for generating electricity.

Then, the oxygen-containing gas consumed at the cathode 40 is discharged along the oxygen-containing gas discharge passage 30b in the direction indicated by the arrow A. Likewise, the fuel gas consumed at the anode 38 flows from the first discharge holes 78a through the outlet side connection channel 74. Thereafter, the fuel gas flows into the second discharge holes 78b, and the fuel gas is discharged along the fuel gas discharge passage 34b in the direction indicated by the arrow A.

The coolant supplied into the coolant supply passage 32a flows through the connection channel 64a into the coolant flow field 46 formed between the anode side metal separator 18 and the cathode side metal separator 20, and then, the coolant flows in the direction indicated by the arrow B. After the coolant cools the membrane electrode assembly 16, the coolant is discharged through the connection channel 66a into the coolant discharge passage 32b (see FIG. 1).

In the first embodiment, as shown in FIGS. 2 and 5, on the surface 20b of the cathode side metal separator 20, the metal portions 82a, 82b are exposed in part of the second flat portion 54 in the area surrounded by the seal lines SL of the anode side metal separator 18.

Thus, in the fuel cell 10, when condensed water is produced between the second flat portion 54 of the first seal member 50, which is an elastic seal member, and the metal portions 82a, 82b as a result of continued power generation, the condensed water is discharged through the metal portions 82a, 82b exposed in at least part of this second flat portion 54.

In particular, in the first embodiment, as shown in FIG. 2, the channel portion having the first supply holes 76a, the inlet side connection channel 72, and the second supply holes 76b are surrounded by the seal lines SL. Thus, in the cathode side metal separator 20, if only the second flat portion 54 of the first seal member 50 should be exposed in the area surrounded by the seal lines SL, blisters could be formed easily. In the present embodiment, in the area surrounded by the seal lines SL, by forming a plurality of cutouts 84a in the second flat portion 54 to expose the metal portion 82a through the cutouts 84a on the channel portion, formation of blisters can be prevented as much as possible.

Thus, in the first embodiment, with a simple structure, condensed water can be discharged from the cathode side metal separator (metal separator integral with a seal member) 20 easily and reliably, and formation of blisters can be prevented as much as possible.

Figure 6:
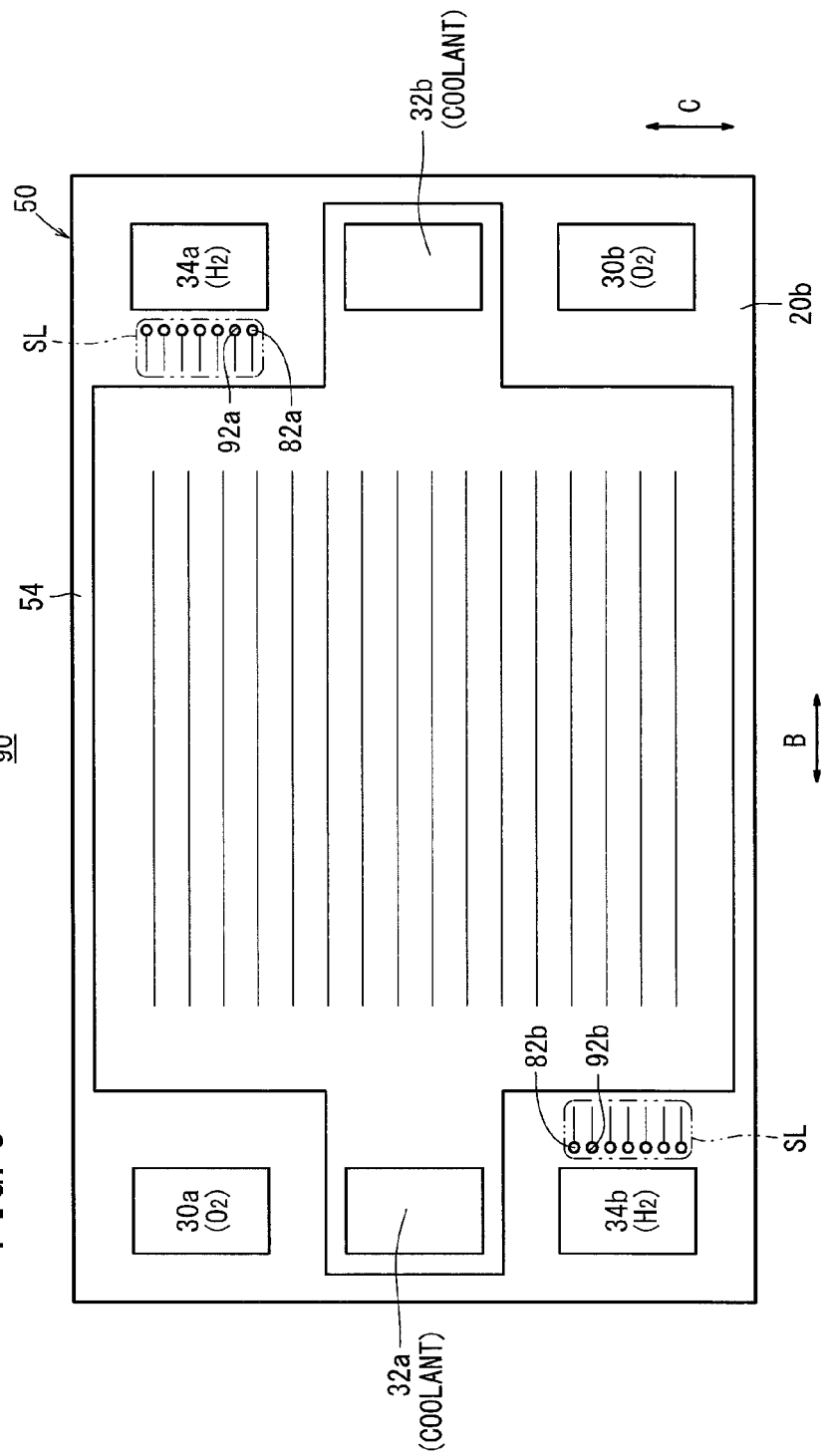
FIG. 6 is a front elevational view showing a cathode side metal separator of a fuel cell according to a second embodiment of the present invention.

FIG. 6 is a front elevational view showing a cathode side metal separator 90 of a fuel cell according to a second embodiment of the present invention.

The constituent elements that are identical to those of the fuel cell 10 according to the first embodiment are labeled with the same reference numeral, and detailed description thereof will be omitted. The same applies to the descriptions of a following third embodiment and subsequent embodiments.

The cathode side metal separator 90 has circular cutouts 92a, 92b formed by cutting at least part of a second flat portion 54 to expose metal portions 82a, 82b through the cutouts 92a, 92b. Incidentally, the cutouts 92a, 92b may have a rectangular shape, a triangular shape, or a polygonal shape. The cutouts 92a, 92b are formed substantially at ends of the channel portions.

Figure 7:
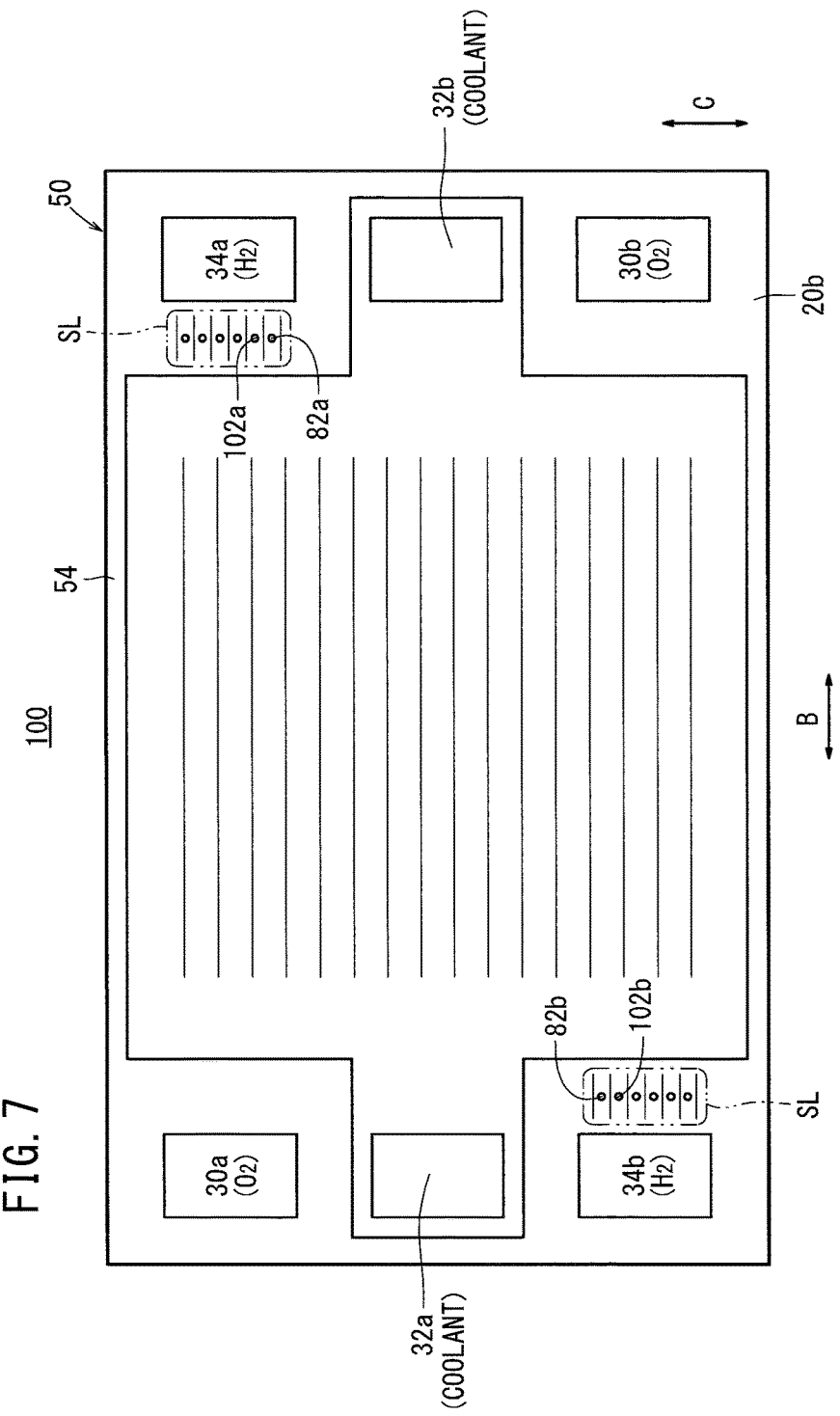
FIG. 7 is a front elevational view showing a cathode side metal separator of a fuel cell according to a third embodiment of the present invention.

FIG. 7 is a front elevational view showing a cathode side metal separator 100 of a fuel cell according to a third embodiment of the present invention.

The cathode side metal separator 100 has circular cutouts 102a, 102b formed by cutting at least part of a second flat portion 54 to expose metal portions 82a, 82b through the cutouts 102a, 102b. Incidentally, the cutouts 102a, 102b may have a rectangular shape, a triangular shape, or a polygonal shape. The cutouts 102a, 102b are formed substantially between the channels.

In the second and third embodiments, the same advantages as in the case of the first embodiment are obtained.

Figure 8:
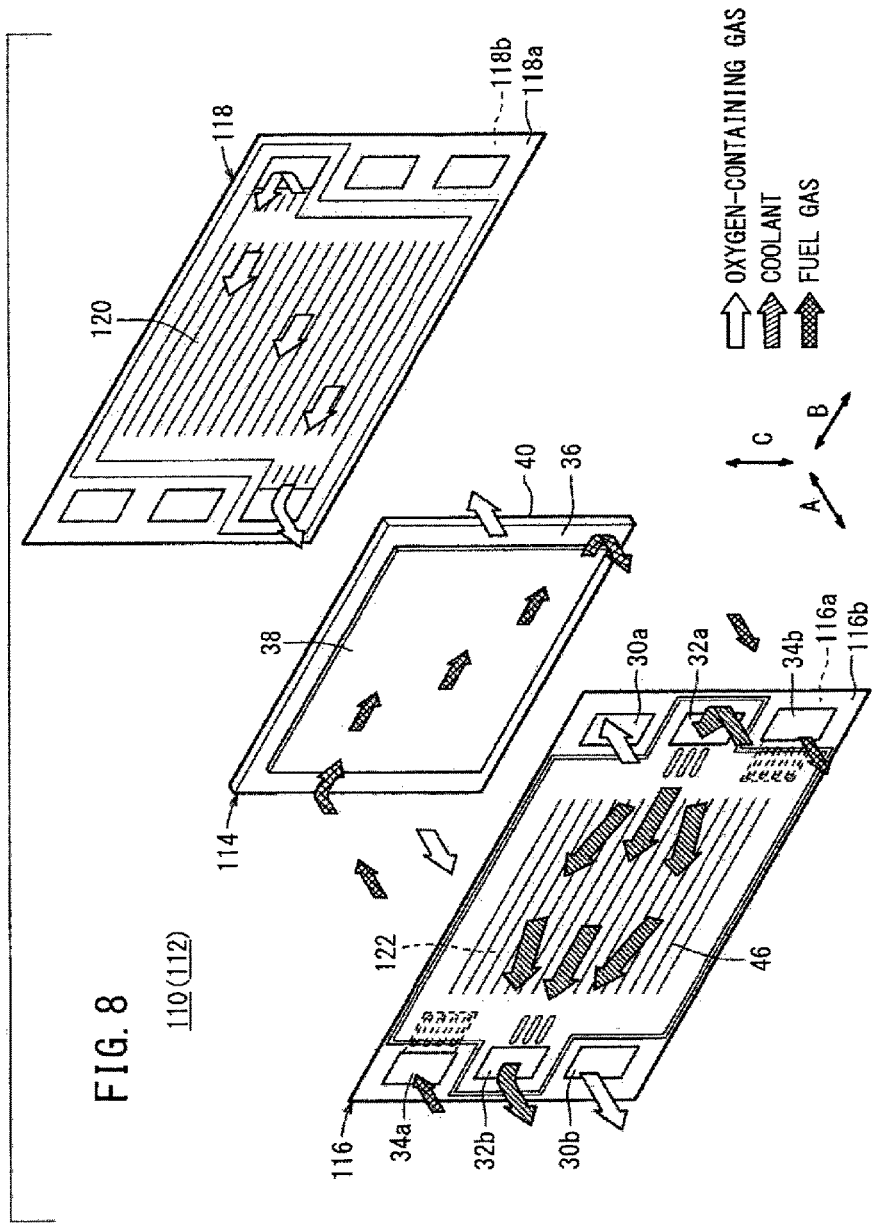
FIG. 8 is an exploded perspective view showing main components of a fuel cell according to a fourth embodiment of the present invention.

FIG. 8 is an exploded perspective view showing main components of a fuel cell 110 according to a fourth embodiment of the present invention.

The fuel cell 110 is formed by stacking a plurality of unit cells 112 in a direction indicated by the arrow A. Each of the unit cells 112 includes a membrane electrode assembly (electrolyte electrode assembly) 114, and an anode side metal separator 116 and a cathode side metal separator 118 sandwiching the membrane electrode assembly 114 therebetween.

The cathode side metal separator 118 has an oxygen-containing gas flow field (reactant gas flow field) 120 formed on a surface 118a thereof facing the membrane electrode assembly 114. The oxygen-containing gas flow field 120 is connected to the oxygen-containing gas supply passage 30a and the oxygen-containing gas discharge passage 30b, and includes grooves extending straight in a direction indicated by an arrow B.

Figure 9:
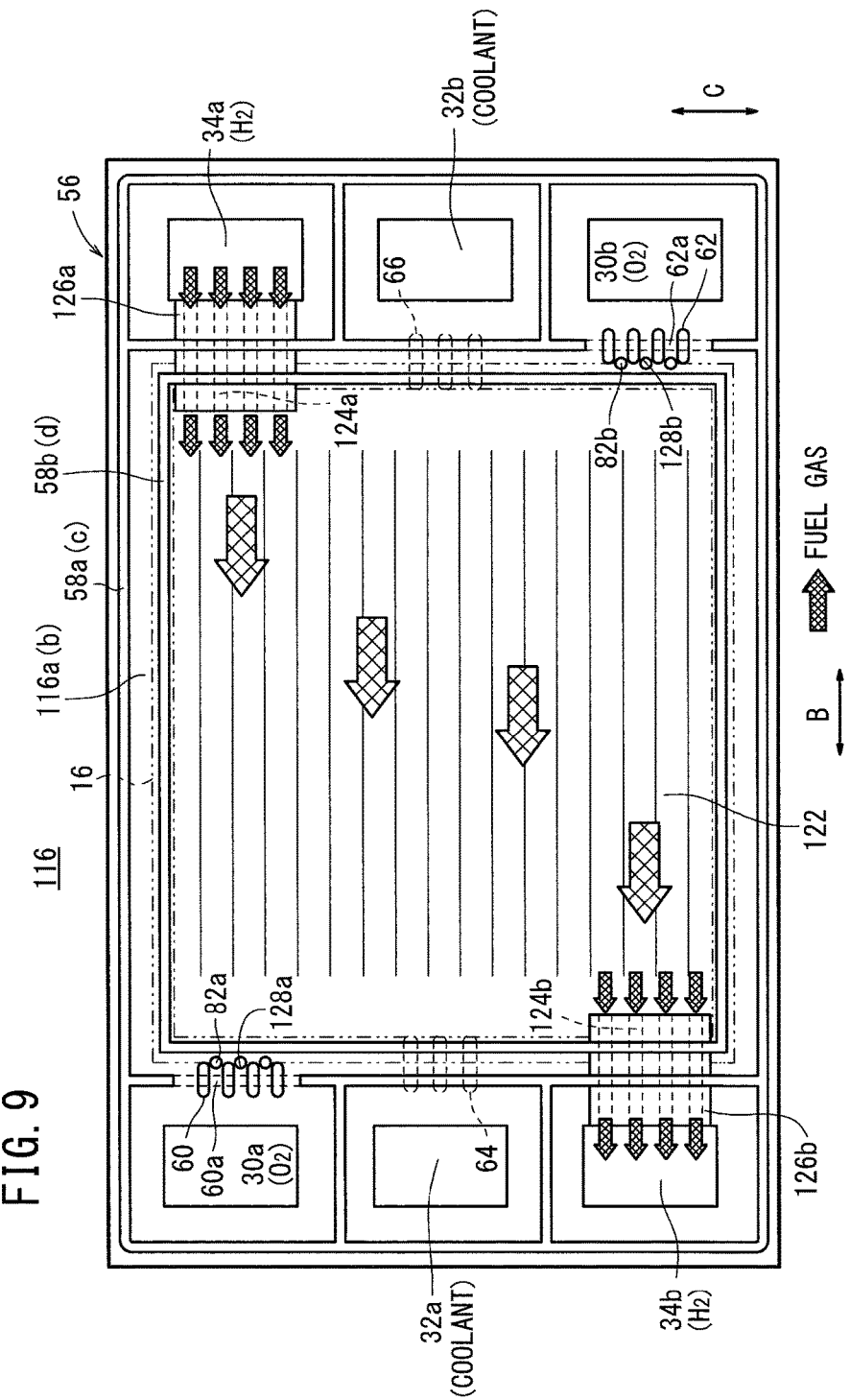
FIG. 9 is a front elevational view showing an anode side metal separator of the fuel cell.

As shown in FIG. 9, the anode side metal separator 116 has a fuel gas flow field (reactant gas flow field) 122 on its surface 116a facing the membrane electrode assembly 114. The fuel gas flow field 122 is connected to the fuel gas supply passage 34a and the fuel gas discharge passage 34b, and includes grooves extending straight in the direction indicated by the arrow B.

The fuel gas supply passage 34a and the fuel gas flow field 122 are connected by a plurality of flow grooves (channel portion) 124a, and the flow grooves 124a are covered by a lid member 126a. The fuel gas discharge passage 34b is connected to the fuel gas flow field 122 by a plurality of flow grooves (channel portion) 124b, and the flow grooves 124b are covered by a lid member 126b.

Figure 10:
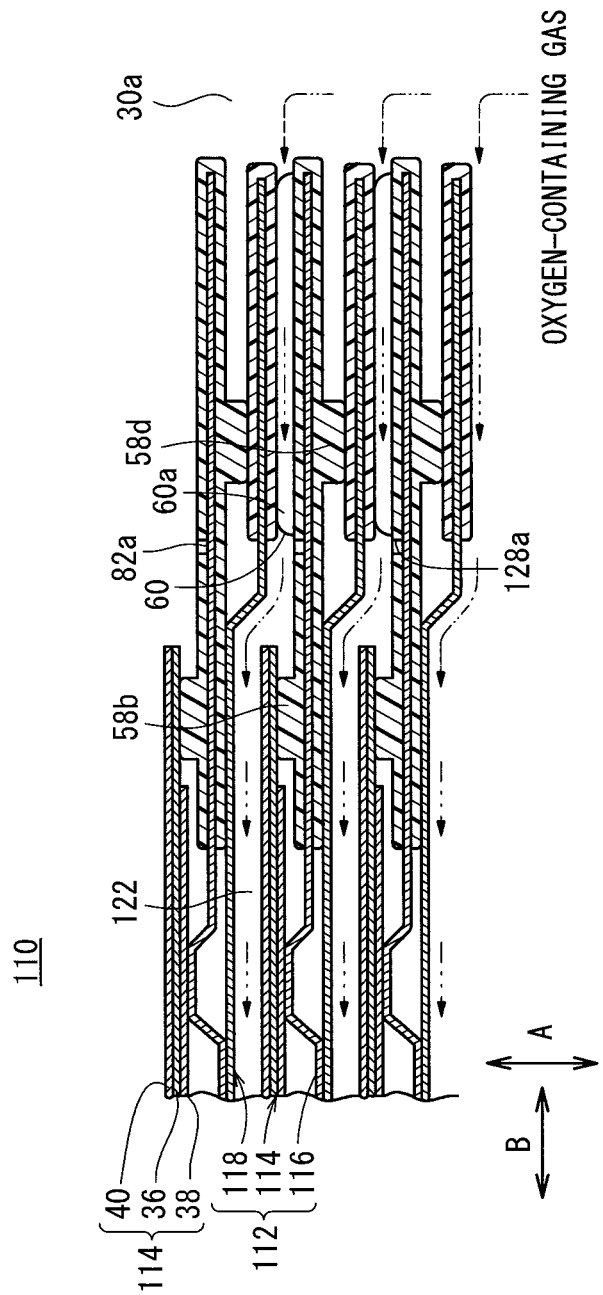
FIG. 10 is a cross sectional view showing the fuel cell.

As shown in FIGS. 9 and 10, the anode side metal separator 116 has circular cutouts 128a formed by cutting at least part of a second seal member 56, at one end of the connection channel 60a formed by receivers 60, to expose metal portions 82a through the cutouts 128a. Incidentally, the cutouts 128a may have a rectangular shape, a triangular shape, or a polygonal shape. The anode side metal separator 116 has circular cutouts 128b formed by cutting at least part of the second seal member 56, at one end of a connection channel 62a formed by receivers 62, to expose metal portions 82b through the cutouts 128b. Incidentally, the cutouts 128b may have a rectangular shape, a triangular shape, or a polygonal shape.

In the fourth embodiment, the cutouts 128a are provided at one end of the connection channel 60a to expose the metal portions 82a through the cutouts 128a, and the cutouts 128b are provided at one end of the connection channel 62a to expose the metal portions 82b through the cutouts 128b. Thus, the same advantages as in the case of the first embodiment are obtained. Further, the cutouts 128a, 128b may have various shapes such as a straight shape or an oval shape in addition to the circular shape.

In the embodiment, the exposed portions are provided only in the cathode side separator. The exposed portions may be provided also in the anode side separator.

Figure 11:
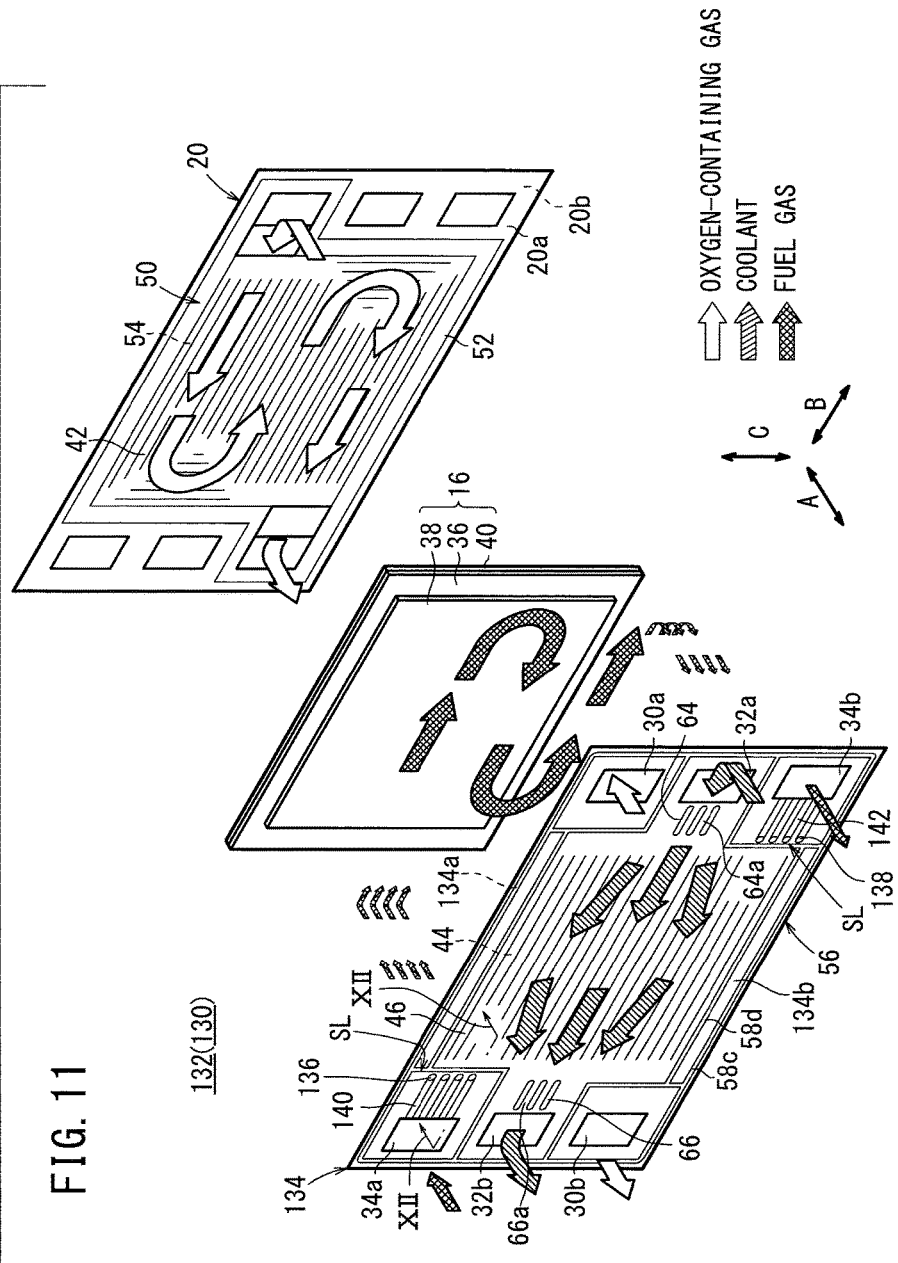
FIG. 11 is an exploded perspective view showing main components of a fuel cell according to a fifth embodiment of the present invention.

FIG. 11 is an exploded perspective view showing main components of a fuel cell 130 according to a fifth embodiment of the present invention.

Figure 12:
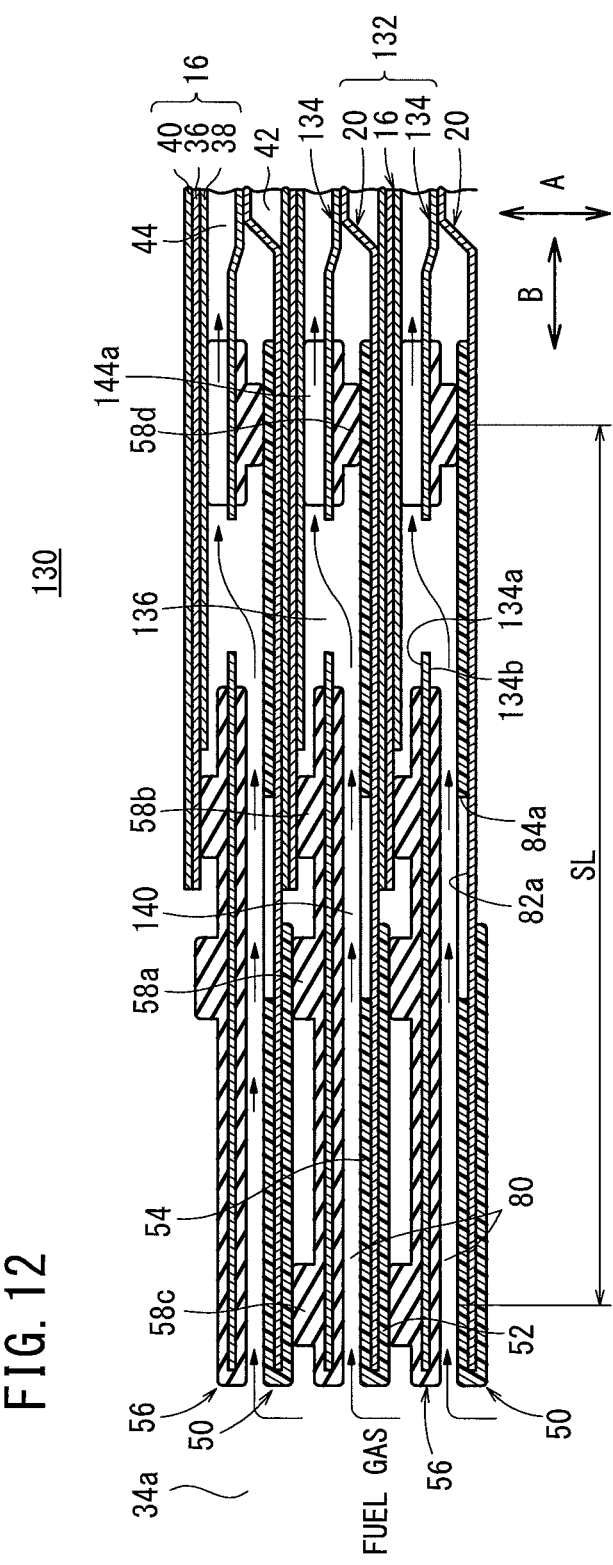
FIG. 12 is a cross sectional view showing the fuel cell, taken along a line XII-XII in FIG. 11.

The fuel cell 130 is formed by stacking a plurality of unit cells 132 in a direction indicated by an arrow A. Each of the unit cells 132 includes a membrane electrode assembly 16, and an anode side metal separator 134 and a cathode side metal separator 20 sandwiching the membrane electrode assembly 16 therebetween (see FIG. 12).

A plurality of supply holes 136 and a plurality of discharge holes 138 extend through the anode side metal separator 134, at positions adjacent to the fuel gas supply passage 34a and the fuel gas discharge passage 34b, respectively. The fuel gas supply passage 34a and the supply holes 136 are connected to each other by an inlet side connection channel 140, and the fuel gas discharge passage 34b and discharge holes 138 are connected to each other by an outlet side connection channel 142.

As shown in FIG. 13, a plurality of island-shaped seals 144a, 144b are formed on a surface 134a of the anode side metal separator 134 by forming cutouts in the second seal member 56 intermittently. The seals 144a, 144b are connected to the supply holes 136 and the discharge holes 138.

Thus, a channel portion connecting the fuel gas supply passage 34a with the fuel gas flow field 44 is formed. The channel portion has an inlet side connection channel 140 and the supply holes 136, and is surrounded by seal lines SL (see FIG. 12).

In the fifth embodiment, the same advantages as in the case of the first embodiment are obtained.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell formed by stacking an electrolyte electrode assembly and separators in a stacking direction, the electrolyte electrode assembly including a pair of electrodes and an electrolyte interposed between the electrodes, elastic seal members being formed integrally with the separators, a reactant gas flow field for supplying a reactant gas along an electrode surface being formed between the electrolyte electrode assembly and the separator, a reactant gas supply passage and a reactant gas discharge passage extending through the fuel cell in the stacking direction, the reactant gas passages being connected to the reactant gas flow field,
an inlet side channel portion connecting the reactant gas supply passage to the reactant gas flow field via a plurality of inlet receiver elements and an outlet side channel portion connecting the reactant gas discharge passage to the reactant gas flow field via a plurality of outlet receiver elements;
wherein, in the inlet side and outlet side channel portions positioned between planar flat seal portions of the elastic seal members, at least one of the planar flat seal portions has therein a plurality of cut-outs in the at least one of the planar flat seal portions so as to expose a flat portion of a separator body of at least one of the separators, wherein the plurality of inlet and outlet receiver elements are separate and distinct from the plurality of cut-outs;
wherein the plurality of cut-outs includes a first plurality of cut-outs each having a straight-line shape and arranged so as to be generally parallel to each other and wherein the first plurality of cut-outs is positioned in at least one of the planar flat seal portions at the inlet side channel portion formed between the reactant gas supply passage and the reactant gas flow field, and a second plurality of cut-outs each having a straight-line shape and arranged so as to be generally parallel to each other and wherein the second plurality of cut-outs is positioned in at least one of the planar flat seal portions at the outlet side channel portion between the reactant gas discharge passage and the reactant gas flow field, wherein the first and second plurality of cut-outs are completely surrounded by the remaining portion of the planar flat seal portions; and
wherein the first plurality of cut-outs faces the inlet side channel portion adjacent to the reactant gas supply passage and the second plurality of cut-outs faces the outlet side channel portion adjacent to the reactant gas discharge passage.

2. The fuel cell according to claim 1, wherein a surface of the separator body excluding the exposed portion of the channel portion is covered by the elastic seal members;

one of the inlet and outlet side channel portions is surrounded by seal lines of the elastic seal members; and a portion of the surface of the separator body is exposed in at least part of the elastic seal members within an area of the seal lines.

3. The fuel cell according to claim 1, wherein a first hole connecting one of the inlet and outlet side channel portions to the reactant gas passage and a second hole connecting the other of the inlet and outlet side channel portions to the reactant gas flow field extend through one of the separators; and the plurality of cutouts are formed in the other of the separators by cutting at least part of the elastic seal member up to the separator body thereby to expose the separator body through the plurality of cutouts.

4. The fuel cell according to claim 2, wherein a first hole connecting one of the inlet and outlet side channel portions to the reactant gas passage and a second hole connecting the other of the inlet and outlet side channel portions to the reactant gas flow field extend through one of the separators; and the plurality of cutouts are formed in the other of the separators by cutting at least part of the elastic seal member up to the separator body thereby to expose the separator body through the cutout.

5. The fuel cell according to claim 1, wherein a hole connecting one of the inlet and outlet side channel portions to the reactant gas flow field extends through one of the separators; and the plurality of cutouts are formed in the other of the separators by cutting at least part of the elastic seal member up to the separator body thereby to expose the separator body through the cutout.

6. The fuel cell according to claim 2, wherein a hole connecting one of the inlet and outlet side channel portions to the reactant gas flow field extends through one of the separators; and the plurality of cutouts are formed in the other of the separators by cutting at least part of the elastic seal member up to the separator body thereby to expose the separator body through the cutout.

\* \* \* \* \*